(12) United States Patent
Payne

(10) Patent No.: US 10,160,513 B2
(45) Date of Patent: Dec. 25, 2018

(54) MODULAR CYCLE TRANSMISSION STRUCTURED INCLUDING TORQUE MODIFYING COMPONENTS AND OTHER ACCESSORIES

(71) Applicant: Thomas Andrew Payne, Arlington, TN (US)

(72) Inventor: Thomas Andrew Payne, Arlington, TN (US)

( * ) Notice: Subject to any disclaimer, the term of this patent is extended or adjusted under 35 U.S.C. 154(b) by 0 days.

(21) Appl. No.: 15/352,575

(22) Filed: Nov. 15, 2016

(65) Prior Publication Data

US 2018/0134341 A1    May 17, 2018

(51) Int. Cl.
| | |
|---|---|
| *B62M 1/36* | (2013.01) |
| *B62K 3/00* | (2006.01) |
| *B62K 21/02* | (2006.01) |
| *B62M 11/04* | (2006.01) |
| *F16D 27/01* | (2006.01) |
| *F16D 27/14* | (2006.01) |
| *F16D 43/00* | (2006.01) |
| *F16H 3/46* | (2006.01) |

(52) U.S. Cl.
CPC ............. *B62M 1/36* (2013.01); *B62K 3/005* (2013.01); *B62K 21/02* (2013.01); *B62M 11/04* (2013.01); *F16D 27/01* (2013.01); *F16D 27/14* (2013.01); *F16D 43/00* (2013.01); *F16H 3/46* (2013.01)

(58) Field of Classification Search
CPC .......... B62K 5/00; B62K 5/001; B62K 5/002; B62K 9/02; B62M 1/36
See application file for complete search history.

(56) References Cited

U.S. PATENT DOCUMENTS

| | | | | |
|---|---|---|---|---|
| 3,340,947 | A * | 9/1967 | Hollinshead | B62M 7/10 180/223 |
| 4,955,451 | A * | 9/1990 | Schaefer | B62D 61/08 180/213 |
| 5,429,379 | A * | 7/1995 | Grigoriev | B62K 25/08 280/212 |
| 7,775,314 | B2 * | 8/2010 | Blais | B62M 23/00 180/224 |
| 9,073,600 | B2 * | 7/2015 | Haan | B62M 1/12 |
| 9,669,895 | B2 * | 6/2017 | Payne | B62K 3/005 |
| 2006/0125205 | A1 * | 6/2006 | Lai | B62K 3/005 280/259 |
| 2017/0050696 | A1 * | 2/2017 | Beresnitzky | B62K 15/00 |

\* cited by examiner

*Primary Examiner* — Kevin Hurley
(74) *Attorney, Agent, or Firm* — William S. Parks

(57) ABSTRACT

A novel cycle device including a transmission assembly (or assemblies) that significantly reduces torque interference with steering operations is provided. Such an assembly is provided in one or more of a modular, fixed or movable configuration according reduced complexity of implementation, improved efficiency of operation, and useful assembly modularity for manufacture and repair. Such a device may further include an improved means for selecting between direct and overdrive functions of a fixed transmission assembly. Additionally, a removable front transmission assembly comprising a steering fork with handlebars is also encompassed herein.

4 Claims, 10 Drawing Sheets

MODULAR CYCLE TRANSMISSION STRUCTURED INCLUDING TORQUE MODIFYING COMPONENTS AND OTHER ACCESSORIES

FIELD OF THE INVENTION

The present invention pertains to a novel cycle device including a removable front transmission assembly (or assemblies), comprising a steering fork with handlebars, pedal crank, driven front wheel, power transmission through one or more of a modular, fixed or movable configuration, an improved means for selection between two alternate power transmission paths, and a torque limitation component with feedback to clearly signal when maximum torque has been reached. In addition to such torque modifying capabilities within a single manual cycle device, such an overall structure also may include a modular unit for encompassing the front drive aspects thereof, and positioning components to ensure continuous and effective gear mesh at assembly interfaces. Such an assembly accords reduced complexity of implementation, improved efficiency of operation, useful assembly modularity for manufacture and repair, and permits movement of suspension between transmission components.

BACKGROUND OF THE INVENTION

Traditional manual bicycle operations involve the utilization of a chain to allow for transfer of power from a pedal gear to a wheel gear to provide the necessary rotational energy for vehicle propulsion. The chain component drives a rear wheel in such an operation while the front wheel is present for balance and steering purposes with a handlebar configuration for control. Recumbent bicycles have been available within the industry for quite some time, providing a unique alternative to the upright cycling position with resultant potential exercise workout improvements for such users. While recumbent cycle designs generally position a pedal assembly above and/or ahead of a front wheel, said front wheel is generally not both steered and driven, due to limitations of the applied transmission technologies.

There have been some developments that have taken into consideration the capabilities of epicyclic gear configurations for power transmission to a steered front wheel within a cycling operation. To that end, such devices tend to utilize a gear train to transmit power across a plane of steering rotation by use of a sun gear coaxial to a steering axis. In principle, this arrangement may allow relatively unrestricted steering, with a further benefit of a high efficiency spur gear transmission. A particular configuration may solve this problem with minimal steering interference under worst-case road-load conditions by using a two-stage transmission system. A first transmission stage, a fixed transmission assembly attached to a vehicle frame, derives input power from a conventional pedal crank and reduces the torque for output to a second stage. A second transmission stage, a movable transmission assembly comprising a movable wheel support structure, such as a front fork steered by conventional handlebars, receives the low-torque power through an epicyclic gear train coaxial to the steering axis, and multiplies the torque as needed to drive an attached, steerable wheel. By this means, a maximum torque transmitted across a plane of steering between fixed and movable transmission assemblies is limited to avoid undesirable steering interference. A torque thus applied to drive a steered front wheel may be further adjusted, if desired, by incorporation of a conventional, multi-speed, planetary transmission located within the wheel hub, for instance, achieving an overall function analogous to the multiple chainwheels and sprockets employed on conventional cycles. Such devices, while effectively achieving the stated function, may benefit from further improvements as disclosed herein.

The ability to accord such a transmission assembly within a structure that is configured for facilitated manufacture and repair, at least, would prove beneficial for reasons of improved economy, quality and reliability. Unfortunately, there is nothing within this art that teaches such an aspect as it concerns torque modifying assemblies and structures. In other words, a modular drive unit for such a cycle device with a torque modifying assembly including a pedal component, in addition to the base torque reducing/multiplying assembly, would allow for greater reliability and reduction in complexity during manufacture, at least. To date, however, as this type of transmission has yet to be accorded this industry prior to such disclosure, the contemplation of any type of modular configuration housing such a component, as well as the pedals themselves, is lacking within the industry.

A means to provide for indications of reaching and limiting torque level maxima, without the need for operator determination and action has not been considered in prior art, despite the enhancement such a function may provide to such manual vehicles. Another potential improvement resides in this cycle area with the utilization and availability of means for detaching modular transmission assemblies on demand and ensuring the interface gears will realign in proper mesh upon reengagement of all contacting and moving parts. Such a gear lash adjustment thus would provide a far greater reliability without fear of gear stripping during, or repositioning error prior to, actual utilization. Such would, again, be greatly and highly desired within this industry. Lastly, the ability to provide such an overall transmission assembly housed within or adjacent to a shock-absorbing suspension of the steerable front wheel would also be desirable in this industry. Such a structural component could accord balanced operations and reduced stresses to the vehicle when operated over different types of terrain, for instance. Nothing, however, within the prior art appears to provide or permit such a unique possible device, particularly as it concerns any type of housing for a transmission assembly. Basically, there remains a rather large amount of significant cycle device components that have yet to be brought to market for structures including recumbent structures. Thus, much remains desired within this commercial space for improvements.

Advantages and Brief Description of the Disclosure

One distinct advantage of the overall disclosure pertains to the utilization of a separable front drive unit (head frame assembly) for placement and incorporation of the entire pedal drive, front wheel, and steering functions of the manual vehicle device. Such a benefit allows for simplified manufacturing and placement (and replacement) of such an integrated assembly, as well as improved capabilities for servicing any problems within such a singular assembly. Likewise, the inclusion of a fully modular fixed transmission assembly within such a head frame assembly would permit such installation and servicing, as well, particularly in relation to a single, or limited numbers of, mounting point(s) on such a head frame assembly, all with standard tools and fasteners, for simplified operations. Another distinct advantage of the overall disclosure is the utilization of a swinging planet gearshift that permits alternative selections of a single power transmission path from two available parallel paths by alternative engagements of an epicyclic idler gear, merely by reversing a direction of pedal crank rotation. This alternate transmission path capability increases the overall effectiveness of the entire transmission function of the cycle device. In such a manner, the presence of this swinging planet gearshift component, which may be contained entirely within the modular fixed transmission assembly, eliminates a need for separate external gearshift controls. Coupled to an input of a movable transmission assembly by an intermediate shaft with universal joints, such a fixed transmission assembly is thus configured as a fully modular power unit, allowing for the aforementioned advantageous detachability from a head frame assembly, effectively free of critical external alignments or adjustments. Another distinct advantage of this overall manual vehicle disclosure is the presence of not only a transmission torque limiting component, but also a torque limit feedback function, as well. Such a component provides, generally, a means to ensure safe operation of the transmission itself during manual operation of the vehicle through the utilization of lighter weight and/or less expensive transmission gearing components, while according the user a sufficient level of torque developed during pedal activation in relation to inclines, terrain, etc. As compared to conventional cycle transmissions that utilize multiple driving and/or driven sprockets selectively engaged by a drive chain, so that suitable drive ratios can be selected to match an efficient pedaling cadence (roughly constant peak pedal force and speed) to variable road load conditions, and shifting of gears is undertaken upon reaching certain human physiological performance limits, such an advantageous system undertakes, as noted above, gears with a wide range of sequential drive ratios from underdrive to overdrive such that a comfortable speed/torque power level of a user to generate may be matched to an effective speed/torque requirement of a driven wheel under various road load conditions. Thus, in tandem with such a torque limiting component is the presence and operation of a torque limit feedback function that advantageously provides means to signal the user that the transmission has attained a certain limit of torque in relation to his or her pedaling in order to permit such a user the capability to then reduce an applied input torque for physiological benefits during such operation, as for example by shifting to a lower drive gear ratio. This advantage allows for direct indication to the user that his or her energy will not be wastefully expended in relation to certain path load conditions and restrictions. Yet another advantage of this vehicle disclosure is the utilization of a gear lash adjustment component in order to ensure that gear meshing will remain consistent and continuous. The presence of the gear lash adjustment component provides the advantageous capability of setting and maintaining accurate relative positioning of gears in a gear train when assembled, in compensation of necessary manufacturing tolerances, including a gear mesh interface disturbed by periodic disassembly. Further, the capability to provide an energy-dissipating structure for steering of a front wheel assembly advantageously allows for greater control and more effective shock absorption for the user, all with the modular unit requirements intact, as well. When a steerable front wheel of a moving cycle contacts an obstruction, such as a curb or an object on a paved surface (not to mention uneven surfaces on certain terrains), there will be a force exerted on a cycle tire, proportional to the product of cycle inertia and velocity change rate (mass times acceleration). In the case of a relatively heavy cycle, such as a tricycle configured to carry a passenger and cargo, such inertial forces may exceed safe limits of conventional, rigid-frame cycle designs, thus necessitating certain shock absorption and/or suspension systems for vehicle protection purposes. Advantageously, then, there may be supplied herewith the disclosed vehicle an effective spring-damper system for controlling peak impact forces integrated into a vehicle steering fork structure, particularly wherein such a component does not unduly impair power transmission efficacy due to relative movement created between such fixed and movable transmission assemblies during operation.

Transmission bevel gears, such as those commonly depicted in gear-driven cycle design disclosures, which transmit torque while rotating about normal axes, generate contact forces with large components in an axial direction, unlike spur gears, making large bevel gears (for example, as may be employed to achieve a 2:1 ratio or higher), especially prone to undesirable and potentially damaging stresses and deflections when operated at high torque levels, as compared to spur gears. A further advantage of the invention thus pertains to the employment under high-torque loading of only relatively strong, efficient and cost-effective spur gears, with small miter gears (1:1 ratio bevel gears) further employed as needed only in relatively low-torque portions of a transmission path, so that stresses on them are minimized and better controlled.

Accordingly, this invention encompasses a number of aspects, as well as complete vehicle structures including a variety of structural requirements. Such include: a wheel support component of a vehicle, said component comprising a housing exhibiting a fork structure supporting at least one wheel through a first, substantially vertical axis of steering, a shock-absorbing material, and a plurality of transmission gears present within said housing, wherein said housing further exhibits a second substantially transverse axis of rotation in relation to said first axis of steering, wherein said transverse axis of rotation generates transfer of any impact energy to said shock-absorbing material during operation of said wheel support component. As well, encompassed herein is a vehicle transmission affixed to a vehicle frame comprising a modular fixed transmission assembly, a manual pedal assembly, a movable transmission assembly, and an intermediate shaft in contact with both of said modular fixed transmission assembly and said movable transmission assembly, wherein said modular fixed transmission assembly receives torque input from said manual pedal assembly, exhibits torque reduction, and transmits output torque through said intermediate shaft to said movable transmission assembly. Such a transmission may further comprise an epicyclic swing gear mechanism, a gear train exhibiting two parallel torque reduction paths, and a common output shaft between said parallel torque reduction paths, said epicyclic swing gear mechanism configured to select alternately between said two parallel torque reduction paths, such that a reversed direction of input rotation to said transmission effects an alternate selection between said two parallel torque reduction paths resulting in an alternate ratio of torque reduction to said common output shaft (with other possible limitations, including wherein said epicyclic swing gear mechanism further comprises a central sun gear, a swinging planet gear exhibiting a sweep path having opposing ends, a carrier, and two pinion gears, wherein said carrier is configured to arrest motion of said swinging planet gear at a position of optimal engagement of said swinging planet gear to one of said two pinion gears arranged at said opposing ends of said sweep path of said swinging planet gear about said central sun gear).

Additionally, encompassed herein is a torque limiting device comprising a hub with a central bore, configured to rotate freely about a coaxial shaft having a central axis. Said hub further comprises at least one magnet fixed in synchronous rotation with said hub about said shaft. In contact with a pole of a said magnet is a first magnetic body. Said hub and said first magnetic body each further comprise one or more contacting elements, such as opposing wedges, preferably composed of a relatively hard, long-wearing material resisting abrasion, optionally formed of said hub or said first magnetic body, or separate parts mounted thereto. Said contacting elements are positioned and sized to create interference preventing a relative rotation of said hub and said first magnetic body, and thereby supporting a transfer of torque through enforced common rotation. Said contacting elements are shaped such that contact forces causing the transfer of torque will also create a proportional axial force between said hub and said first magnetic body tending to force a separation therebetween, opposed by a magnetic attractive force existing between a said magnet and said first magnetic body. At a time when said axial force exceeds and overcomes said magnetic attractive force, a said magnet within said hub will suddenly release contact with said first magnetic body, allowing increased separation between said hub and said first magnetic body, and further allowing mutual passage of said contacting elements therebetween. Due to a continuing, though reduced, attractive force exerted on said first magnetic body by a said magnet, said hub, first magnetic body, and contacting elements will be constrained to remain in moving contact during an interval of low-torque rotation of said hub about said shaft, said interval defined by the circular pitch of said contacting elements on their respective bodies. At a completion of said interval of low-torque rotation, said contacting elements of said hub and said first magnetic body will align, translationally returning said first magnetic body to contact with a said magnet, and restoring a previous condition of full-torque transfer, thus completing a cycle of operation of a torque-limiting function. For increased holding force of a said magnet in contact with said first magnetic body, a second magnetic body may be added in contact with the opposite pole of a said magnet vis-à-vis a said first magnetic body, to concentrate magnetic fields therein. In practice, a torque-limiting device may be incorporated in a transmission such that said first magnetic body may be driven by a shaft, and said hub may be incorporated into or be driving a gear rotating about said shaft, causing a transfer of torque between said shaft and said gear to be limited by a described device function.

Alternatively, such a device may be configured so that said second magnetic body breaks contact with a said magnet, allowing said first magnetic body to remain in continuous contact therewith. Such a function would clearly indicate significant sliding contact between said first magnetic body and said hub containing a said magnet during an interval of low-torque rotation. Though a transmitted torque may be relatively low, friction forces generated by magnetic attractive forces may result in rapid wear and damage to relatively soft magnet surfaces. Accordingly, a hub may be further divided into interior and annular portions, where an interior hub body contains a said magnet in continuous contact and synchronous rotation with said first magnetic body, and an annular body containing contacting elements is constrained to rotate about, and coaxial to, said interior hub. Such a device may therefore achieve passage of said contacting elements between said first and second magnetic bodies when said second magnetic body is forced to separate from a said magnet by axial reaction forces exceeding the magnetic attractive force therebetween. Especially in the case where said annular body comprises a gear engaged in mesh for power transmission, such a "split hub" configuration is advantageous in that no axial translation of either a first magnetic body or a hub comprising a gear function is required in operation, thus eliminating significant sources of functional variation caused by sliding friction or binding at heavily loaded interfaces with a shaft or gear teeth. It will be understood by one of ordinary skill in the art that parameters such as magnet strength, proximity and dimensions of magnetic bodies, and position and shape of contacting elements, can be used to control and even adjust an operating torque limit of the device. For example, magnetic bodies may comprise thin steel plates that may be added or removed as required to increase or decrease a magnetic holding force.

An abrupt change in torque transmitted during said interval of low-torque rotation, caused by said sudden contact release between a said magnet and said magnetic body, may be perceptible to a user manually generating said input torque, thereby creating a sensation serving to alert said user that said limitation of torque has been reached, and that continued input of excessive torque will not be usefully employed in transmission to a drive output, therefore indicating a need for selection of a more favorable transmission gear ratio for continuance of efficient operation.

Comprehensively, then, this overall disclosure encompasses a manual vehicle comprising a frame, a vehicle transmission, a manual pedal assembly, at least one rear wheel, at least one front wheel, and a steering component exhibiting a steering axis, wherein said steering component, manual pedal assembly, transmission, and at least one front wheel are provided within a single modular unit, wherein said vehicle transmission comprises a swinging planet gearshift assembly, wherein said vehicle transmission further comprises a torque measuring and limiting component exhibiting a torque limit feedback function, wherein said vehicle further comprises a gear lash adjustment mechanism at gear mesh interfaces of modular transmission assemblies, and wherein said singular modular unit further comprises a steering fork with handlebars. Additionally, this disclosure relates to each of these novel components provided individually or in any other combination for utilization within and with a manual vehicle, such as a bicycle, tricycle, whether of recumbent, conventional, or other configuration for operation.

The inventive cycle device thus includes a unique manually operated transmission that is effectuated through a pedal crank that is aligned through a gear assembly to reduce the torque generated thereby by a sufficient amount to reduce interference with the steering capability during actual operation, preferably at least $1/10$, and possibly as much as or more than $1/24$. Such a transmission allows for torque reduction until the kinetic energy generated through the gear device is transferred to an epicyclic gear assembly that subsequently provides an increase in torque for delivery to the wheel. In this manner, although the torque generated by the user may be relatively high, the steering effect of such a level will not deleteriously impact the steering capacity of the cycle device as a result. Generally, it has long been understood that torque driving a steerable wheel may potentially cause a steering effect noticeable from certain fluctuations in the magnitude of said torque in transmission. Such effect may cause difficulty to the person steering as the force needed to overcome such a situation can be quite substantial. Other devices (such as automobiles, for instance) can compensate for such phenomena through proper engineering developments. With pedal crank cycles, however, these issues have not been considered to such a degree, if at all. Thus, the inventive transmission allows for a recumbent cycle device that allows a user to properly steer with minimal, if any, interference from the torque generated thereby.

Additionally, then, the overall disclosed manual vehicle includes a modular unit for, as noted above, ease in manufacturing and in servicing, at the very least, for the cycle itself. Such modularity is a concept more commonly applied to motor vehicles, not conventional manual cycle devices. Implementation of modular assemblies within the manual cycle industry is more common for transport facilitation purposes (cycles easily folded up and/or disassembled for compact transportation and storage), generally avoiding power transmission aspects. Such designs typically avoid manual rearrangement of power transmission elements, a task difficult to accomplish cleanly or conveniently with conventional, open chain-drive configurations.

For this disclosure, then, such a modular power unit receives input from conventional cycle pedal cranks attached thereto and comprises a housing assembly supporting and substantially enclosing a plurality of shafts, and gears mounted thereon; a torque limiting component; a swing gear transmission path selector; an output shaft mating with an external drive shaft. The component pedal cranks are mounted conventionally to a common shaft, which further includes a coaxially mounted ring gear (analogous to a conventional chain ring). Such a ring gear drives a smaller pinion gear on a parallel shaft, which creates the effect of an initial source of torque reduction for the transmission. Said pinion gear may be mounted external to a power unit housing on a pinion shaft. A sun gear of a swing gear mechanism is mounted to said pinion shaft inside a power unit housing.

As it concerns the capability of a manual cycle vehicle to alternate between drive paths within a transmission assembly, bi-directional crank input, for instance forward or backward pedaling, has been known to divert drive power in order to effectuate differences in forward drive speed ratios without manual gear shifting requirements. However, such systems, which may employ a planetary gear set(s) incorporated into a drive hub between pedal cranks, have been avoided in favor of conventional front chain "derailleur" mechanisms selecting drive paths from a plurality of crank-driven chain sprockets. As well, conventional upright cycles locate a seat on a frame for optimum leg thrust efficiency on down-strokes when pedaling in a forward direction, a position perhaps less efficient for pedaling in a backwards direction. In either case, the utilization of a modular power unit with capabilities of "on the fly" drive path selections via a gear-based transmission assembly has not been prevalent, or, for that matter, even existent, within the manual cycle industry.

To that end, it has been realized that a particular type of epicyclic gear mechanism, sometimes referred to as a "swing gear" (and alluded to above with the modular power unit), utilizes the driving force reaction between a rotating sun gear and a planet gear to effect simultaneous rotation of a planet gear about the axes of both gears. As such a planet gear rotates in either direction about a sun gear axis, it is brought into engagement with a remote gear on a separate axis of rotation, at which point the planet gear may rotate only about a planet axis. This gear thus functions as an idler gear between a sun gear and a remote gear, held in mesh by the drive reaction forces between meshing gears. For this to function properly, at least in one possible embodiment, two remote gears are then positioned on separate axes to be driven alternately by such a planet gear (depending on the rotation direction of the sun gear driving the planet gear, that is). By this means, the operator/user may select a suitable transmission power path in relation to the direction of drive rotation of the planetary gear. Such mechanisms have never been applied in such a manner within vehicular transmissions (whether manual or automatic in nature).

In greater detail, then, such a rotating planet gear (swinging gear) of a swing gear mechanism is mounted to a carrier constrained to rotate about a sun gear axis, keeping the planet gear in constant mesh with the sun gear. The swing gear mechanism is configured to divert torque from the sun gear to either of two alternate transmission paths of a power unit, such that a particular power transmission path is selected by a particular direction of input shaft rotation (i.e., "forward" rotation of a pedal crank, in a conventional manner of a bicycle, may engage a "direct" drive transmission path of a power unit, whereas reversed rotation, or "back pedaling," may engage an "overdrive" transmission path exhibiting further torque reduction and increased output speed). Importantly, the disclosed manual vehicle device further includes an inventive carrier rotation stop function to prevent over-engagement of an idler and a spur gear in operation. Spur gears are designed to mesh at a distance of separation creating backlash, or back-side clearance between opposed, mating teeth of gears. If such gears are forced together such that interference occurs on both flanks of any gear tooth at any time, friction, rough operation, and damage may result. As a result, a swing gear mechanism lacking said inventive carrier rotation stop may prove useful only for low-power applications such as small appliances. To compensate for such considerations, then, the disclosed manual vehicle device may include a simple and effective stop shaft device to position mating gears correctly during operation, if desired.

In general, then, a first power transmission path is engaged when the swing gear pivots to mesh with a spur gear of a transfer shaft. Subsequently, then, a second gear of the transfer shaft engages with a spur gear on a miter gear shaft. Alternatively, a second power transmission path engages when the swing gear pivots to mesh with a small gear on a first reduction shaft. A large gear on the first reduction shaft transfers a reduced torque to a small gear on a second reduction shaft. A large gear on the second reduction shaft may then transfer a further reduced torque to a spur gear on the miter gear shaft. Subsequently, torque from either the first transmission path or the second transmission path is transferred from a first miter gear on the miter gear shaft to a second miter gear on a longitudinal output shaft. A protruding end of the longitudinal output shaft mates with an external intermediate shaft, and may utilize a conventional universal joint.

Mechanical power transmission torque is commonly limited by a known and inherently or purposefully limited capacity of a prime mover (e.g., engine, motor) to generate torque. Transmissions may utilize devices such as a friction disc clutch, fluid coupling, hydrostatic drive, etc., that may provide some protection against transient peak loads, as may be encountered during rapid changes of rotational and/or vehicle momentum, such as a sudden stop. Slippage of a friction clutch may generate damaging heat and/or wear, and must be carefully controlled. Fluid couplings are relatively complex and introduce significant power transmission efficiency losses. Some transmissions may utilize sacrificial elements such as shear pins or soft keys of shaft mounted elements, such as a shear pin commonly used to protect a transmission of an outboard engine in case of a propeller striking an underwater obstacle. Such devices (i.e., pin or key) would be analogous to the function of an electrical fuse, as replacement of the failed device is required to restore a power transmission function.

Past developments in this area are lacking a mechanical analog of a simple, fast acting, self-resetting, electrical circuit breaker, a device applicable to human-powered vehicle transmissions that otherwise need no function to decouple a load from a prime mover. Numerous torque limiting devices have been proposed and implemented for light duty and/or intermittent use applications, such as tape recorders and fishing reels, but none is known to higher torque transmissions common in vehicular applications.

For effective operation, a torque-limiting function should be introduced in a power transmission path between a pedal crank and a gear common to both direct and overdrive transmission paths. If placed elsewhere in a power transmission path, all gears of a transmission may not be adequately protected by a single torque limiting device. It may be further desirable, as described herein, to combine a torque-limiting function with an existing transmission function, such as a gear.

In a preferred embodiment, a sun gear of a swing gear mechanism further comprises a torque-limiting device. A hub of the sun gear comprises a central bore, coaxial with external gear teeth, and configured to rotate freely about a shaft. An interior web of the sun gear comprises a symmetrical pattern of holes through which are installed a plurality of bearing balls and permanent magnets, such that the balls and magnets are constrained to synchronous rotation within the sun gear about the shaft. At both sides of the interior web of the sun gear, and in contact with opposite poles of the magnets, are magnetic plates. The balls may be up to 40% larger in diameter than the magnet thickness between poles. A first indexing plate is arranged in contact with the magnets, and further contains windows in number, position, and size to allow coincident, partial protrusions of the balls. A second magnetic plate remains in continuous contact with the balls and opposite poles of the magnets, vis-a-vis the indexing plate, and functions to concentrate magnetic fields of the magnets for increased holding power of the indexing plate. The indexing plate further comprises an engagement slot for a pin inserted through the shaft, adjacent to the sun gear. Accordingly, the indexing plate is constrained for continuous, synchronous rotation with the shaft, likewise supporting a transmission of torque therebetween. Such torque applied to the indexing plate is in turn transferred through points of mechanical interference between edges of the windows contacting the balls within the sun gear, thus acting to drive the sun gear in synchronous rotation. At a point where a protruding ball contacts an edge of an indexing plate window, a reaction force features a tangential component, which transfers torque between rotating members, and an axial component, which acts against a force exerted by the magnets holding the indexing plate. The tangential and axial components of a reaction force are geometrically related by an angle of tangency at a point of contact on a surface of a ball. Accordingly, an increase in net tangential force created by applied torque causes a related increase in net axial force acting against the net attractive force of the magnets. At any time when a net axial force created by a torque exceeds a net attractive force of the magnets, such as, for example, when an external load acting through a mesh gear sufficiently constrains rotation of the sun gear, the indexing plate will suddenly and simultaneously release from contact with the magnets, and the indexing plate will both translate axially to a separation gap distance and rotate relative to the sun gear, as edges of the windows slide over contacting surfaces of the balls. Due to a continuing, though reduced, net attractive force exerted on the indexing plate by the magnets, the indexing plate will be constrained to remain in contact with the balls, at a separation gap distance from the sun gear, during an interval of low-torque rotation of the sun gear and balls, occurring between the windows of the indexing plate. At completion of the interval of rotation, proximate window opening edges will slide along contacting surfaces of the balls, translationally returning the indexing plate to contact with the magnets, and restoring a previous condition of full-torque transfer, thus completing a cycle of operation of a torque-limiting function.

As well, prior art torque-limiting methods do not typically incorporate an intentional, torque-modulated feedback means to signal operational status, as a user is apt to sense this means only via manual operation of a pedal crank or equivalent apparatus. Clearly, unintelligent, mechanical prime movers would not be advantaged by such a function. Typical human powered vehicles do not employ torque-limiting transmissions, instead relying on operator judgment or human strength limits to safely control applied input forces. However, in the absence of supplied information, such as external measurements, humans may not reliably judge absolute magnitudes of forces applied by muscular exertion within a useful accuracy.

During an interval of low-torque rotation of an indexing plate and a shaft relative to a sun gear, a pedal crankshaft in synchronous rotation through gears in mesh will likewise exhibit an interval of relatively low-torque rotation. A relative duration of such intervals will directly correspond to a drive ratio of said gears in mesh. An angular spacing of window openings of an indexing plate, multiplied by a ratio of said gears in mesh, will determine an angular rotation of a crankshaft during a low-torque operating interval. As this interval of torque modulation serves to signal an operator that a useful limit of applied transmission torque is reached, a reasonably limited angular pedal movement, perhaps less than 5°, should provide effective and controlled feedback. The present invention exhibits numerous advantages as compared with conventional devices. Because powerful magnets may be smaller than coil springs commonly used to apply clutch forces of a similar magnitude, the inventive device may be compact in size, accommodated within an existing component volume, and without external force reactions. Because components generating a releasing force in opposition to a magnetic force are bilaterally symmetrical, the inventive device may operate equally in either of two directions of rotation without inherent bias or added complexity. Because permanent magnets of particular value for high permeability, such as neodymium "rare earth" magnets, are also known for stable and precise properties, a properly designed mechanism may be expected to maintain a nearly constant function over a long period of use without adjustment. Finally, a claimed device, by utilizing magnetic bodies in direct and simultaneous contact with both poles of all magnets, may achieve the maximum possible holding force from a combined magnetic flux. It is important to note that a magnetic field exhibits reducing attractive force vs. increasing separation distance, whereas a spring will exhibit increasing reaction force vs. increasing deflection distance. At a point a magnetic holding force is overcome, and a body moves in separation therefrom, a magnetic force will sharply decrease, allowing for a desirable "snap-action" characteristic of a torque-limiting function. Thus, over a small interval that an indexing body is allowed to rotate relative to a hub, a transmitted torque is suddenly and greatly reduced, clearly signaling such a function to a user generating an applied torque. Furthermore, due to a sudden release of a magnetic body from magnet contact, movements between parts under load, especially near a point of release, are minimized or eliminated, thus greatly reducing wear on contacting parts, as for example compared with spring or friction clutches, and thus prolonging a useful component service life. A device of similar simplicity, utilizing springs to generate holding force instead of magnets, may suffer adverse effects of increasing contact forces as contacting surfaces are gradually disengaged.

A spur gear-driven cycle is relatively uncommon and prior art relating to adjustment of gear mesh at a removable component assembly interface is undetermined.

Dimensional variations of manufactured parts often exceed the functional tolerance limits of assemblies derived therefrom, such that adjusted positioning of parts may be required upon assembly. Adjustable cams are commonly applied to achieve controlled positioning of machine elements within a prescribed accuracy. Such cams are often of an eccentric, convex curvature, such that an increasing or decreasing radius from a center of rotation is a smoothly continuous function of angular position. A cam of such profile is commonly applied to create variable positioning of machine elements in opposition to a flat or convex surface of opposite curvature. This situation, however, causes highly concentrated stresses at a point of contact. For applications where such contacting surfaces are not protected by lubrication, and where contact forces and therefore stresses may be large relative to strengths of available materials, damage to contacting surfaces and degradation of function may be expected. A particular alternative for such applications is division of a cam profile into discrete indexing steps, each occupying a prescribed sector of a total profile circumference, such that contact of surfaces within each sector is spread over a corresponding interface region, together representing steps of incrementally changing radial distance from a center of cam rotation. An indexing cam device may therefore divide a range of positioning into a fixed number of discrete and identifiable steps, with each step serving to reduce contact stresses within safe design limits, and further informing a condition of machine adjustment in a manner useful for functional quality control. For example, when such an indexing cam device is applied to control gear lash at a driven wheel interface, a service person can be directed to increase or decrease gear lash as may be needed, by incrementing or decrementing a labeled position step in a simple, intuitive manner.

Conventional bicycle and tricycle frames designed for street (smooth surface) use are generally un-sprung to save weight and complexity. Rider comfort over bumps is improved by incorporating suspension springs into seat and sometimes handlebar mounts. Bicycles intended for off-road use frequently incorporate small coil springs and/or shock absorbers applied to various movable suspension geometries on one or both wheels, typically following motorcycle designs. Contemporary bicycle suspension design favors spring-damper elements (such as coil-over shock absorbers) coaxial with a pair of telescoping fork tubes bilaterally symmetrical to an axis of steering. Such suspensions are configured for high linear travel at relatively low forces parallel to a fork axis, designed for driver comfort and control on surfaces of widely varying roughness, functionally equivalent to a common motorcycle "triple-tree" configuration. However, it is well known that axially telescoping fork arm suspensions may not effectively dissipate bending moments applied to a fork by contact of a front wheel with a vertical surface over which the wheel cannot easily climb by rolling, such as a deep pothole, tall curbing, or a wall, and where a resultant force is not closely aligned with a fork axis. Motorbike front suspensions have sometimes adopted one of several "springer" mechanisms: forks with symmetrical linkages supporting a wheel and transferring certain forces from a wheel to a frame through springs intended to dissipate harmful transient peak energy of road shocks. Some springer fork designs are effective at dissipation of fork arm bending moments; others are not.

Peak impact forces on a structure resulting from a collision are generally reduced by increasing the time duration over which collision energy is applied to, and absorbed by, a structure. To improve system performance beyond that achieved by the inherent configuration and materials of a structure, additional spring and damper devices of carefully controlled characteristics may be added. As commonly practiced by those skilled in the art, stiffness and damping characteristics of a vehicle suspension are designed to smooth the transfer of energy between wheel suspension and vehicle frame structures by resisting relative motion therebetween, such that peak forces are reduced and controlled within acceptable design limits under heavy loading. In the present invention, spring-damper elements progressively resist rotation of a movable transmission structure (e.g., fork) about a pivot shaft in a like manner. An inventive structure utilizes a transverse, frame-mounted pivot shaft, about which a movable transmission structure may rotate when acted upon by forces in a normal plane of rotation. Such a rotation, in reaction to an applied moment, is resisted by a spring-damper, shock absorbing element configured to both increase a time duration of energy transfer between structural elements, and uniformly direct energy of movable transmission rotation into a substantially vertical force acting to lift a vehicle frame against gravity. By this means, potentially damaging bending moments within a movable transmission structure may be safely limited, with energy dissipation acting primarily to lift a vehicle frame vertically and in a potentially less damaging manner.

Such a pivoting suspension of a movable transmission structure may be accommodated during operation, without damage or interruption of power transmission between a power unit fixed to a frame and a pivoting movable transmission unit, due to incorporation of a floating intermediate shaft (FIG. 2, item 8) utilizing pivoting, universal-type joints at one or both ends. A described configuration allows sufficient travel of an appropriate shock absorbing element with acceptable movement of a wheel in a substantially horizontal direction, while maintaining acceptable in-plane motion of said universal-type joints. It will be readily apparent to one of ordinary skill in the art that a flexible drive shaft may be employed as an alternative to rigid shafts and gears within some portion of a transmission path between or within fixed and movable transmission assemblies, resulting in equivalent achievement of the overall claimed functions.

A contact force exerted on a front cycle tire will generally result in a force of equal direction and magnitude applied to a conventional suspension fork, and in turn to a supporting frame structure to which such a fork may be pivotally mounted. In addition, such a resultant contact force will typically generate a moment ("body twisting force") tending to rotate and/or bend a fork at a connecting frame structure, at least to an extent that a resultant contact force and a structure are not aligned in a direction from a point of contact to a point of rigid frame body support. A resultant contact force may be further resolved into horizontal and vertical components. A vertical component of a contact force may act to lift a wheel, fork, and frame structure (that portion of vehicle mass carried by a wheel) against gravity, a force that structures are generally able to tolerate most easily. A horizontal component of a contact force may act to decelerate a moving vehicle in proportion to total vehicle inertia, and though potentially of a much higher magnitude, a horizontal force by itself also may be well supported by a vehicle frame structure. However, a significant bending moment supported by a frame at a fork attachment interface may easily generate excessive stresses within said structures. Because a direction of a resultant contact force is directly determined by a ratio of wheel diameter to obstacle height, a relatively small front wheel creates a relatively high risk of fork structure deflection or damage due to a relatively large applied bending moment. As an inventive, front-drive, movable transmission structure houses an alignment-sensitive gear train, it is a particular object of invention to safely control peak bending stresses of a movable transmission structure, to prevent excessive transient or permanent deflections and misalignments of a comprised mechanism. A simple, effective, and inventive movable transmission suspension is capable of controlling stresses caused by vertical and horizontal components of a resultant wheel contact force, while also effectively controlling and dissipating energy of a moment created by a non-aligned resultant contact force.

BRIEF DESCRIPTION OF THE DRAWINGS

FIG. 3b depicts an interior side view of the transmission assembly of FIG. 3a.

DETAILED DESCRIPTION OF THE DRAWINGS AND PREFERRED EMBODIMENTS

The invention is herein described in greater detail through the utilization of the accompanying drawings. By no means are these drawings and accompanying descriptions intended to limit the scope of the invention as the ordinarily skilled artisan within this area would fully understand the breadth of the inventive device(s) herein discussed.

The inventive transmission accords surprising and beneficial characteristics to a recumbent cycle device, namely the ability to provide high mechanical efficiency so the operator does not expend too much energy during actual operation, while permitting nearly unrestricted steering function and a sizeable steering motion range, and little to no steering control effect through pedal-created torque.

With all of this provided by the inventive transmission and thus the inventive manually operated recumbent cycle device, potentially preferred, though not necessarily required, embodiments are further provided within the drawings.

Figure 1A:
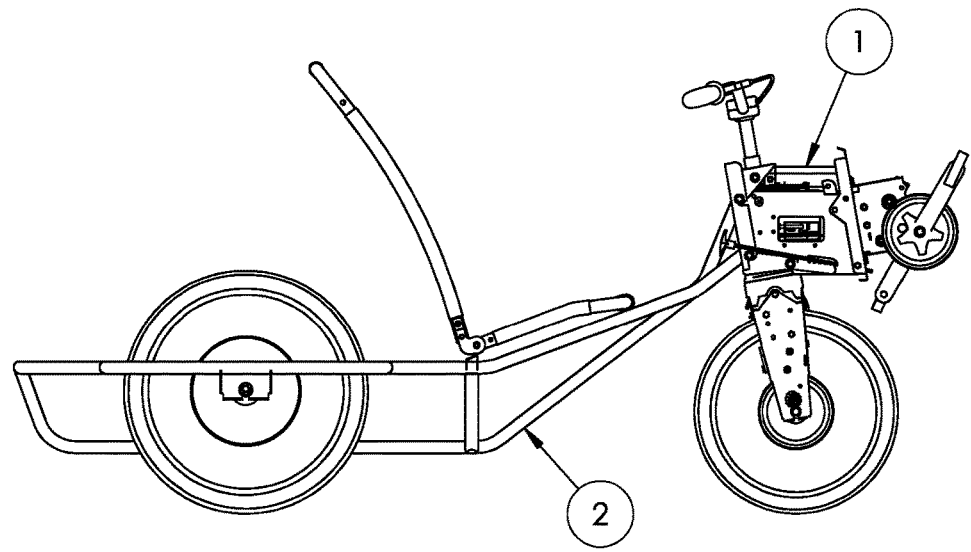
FIG. 1a shows a side view of a potentially preferred embodiment of an inventive manually operated cycle device.
Figure 1B:
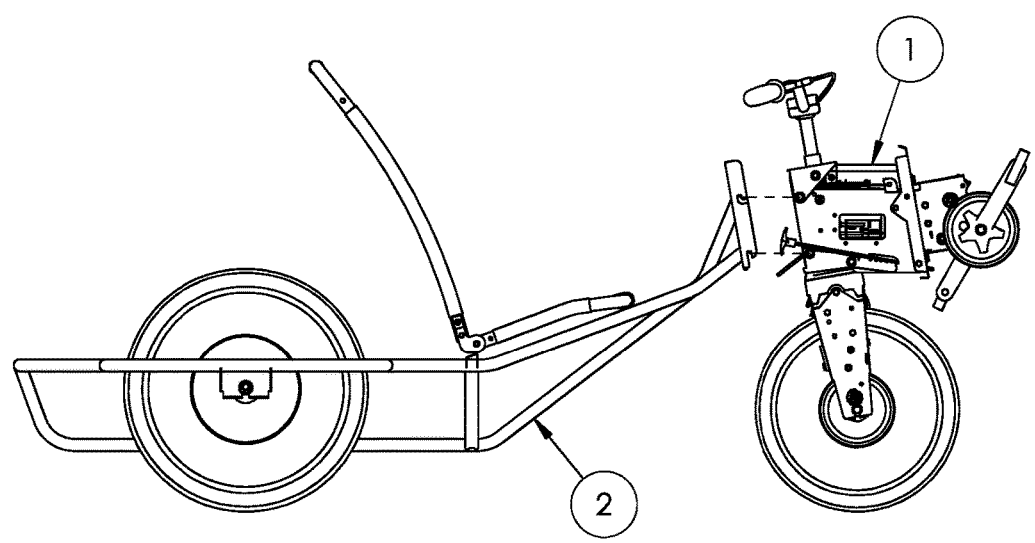
FIG. 1b shows the same cycle device of FIG. 1a with a modular unit disengaged therefrom.

FIG. 1 shows a right-hand side view of a head frame assembly (1) both attached (FIG. 1a) and detached (FIG. 1b) from a main frame assembly (2), for a pedal-powered (manual) vehicle (that may also include an electrical component for automated maneuvering and driving, as well).

Figure 2:
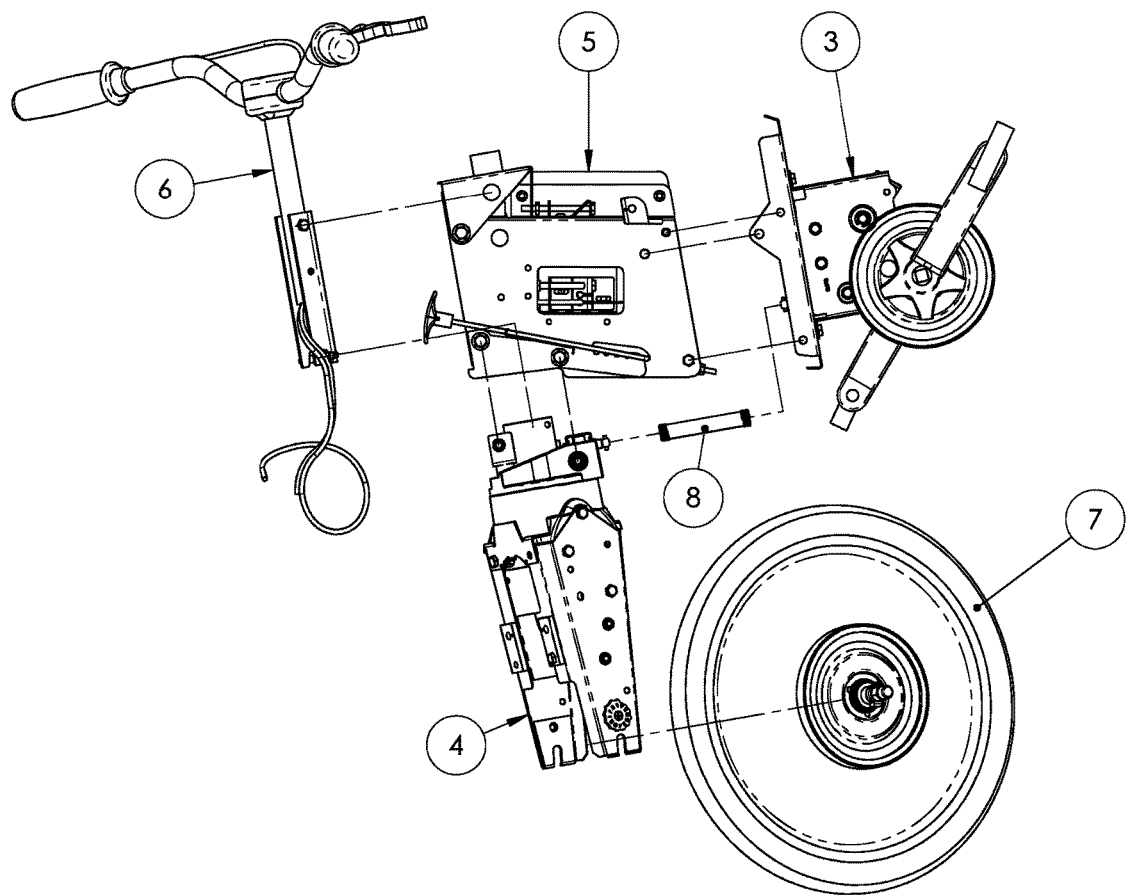
FIG. 2 shows a separated view of the components of a modular unit of the inventive cycle device.

FIG. 2 shows a head frame assembly further separated into sub-modules: a power unit (fixed transmission assembly) (3), a movable transmission unit (4) mounted to a head frame housing (5); and a steering column with handlebars (6), mounted to the movable transmission unit and the head frame housing, with a wheel assembly (7) further separated from the movable transmission unit. These units comprise major, separable modules of a modular head frame assembly for the vehicle. An intermediate shaft (8) connects an output shaft of a power unit with an input shaft of the movable transmission unit, as well. Steerable portions of the movable transmission unit, steering column, and wheel assembly are shown slightly rotated as in a left turn.

Figure 3A:
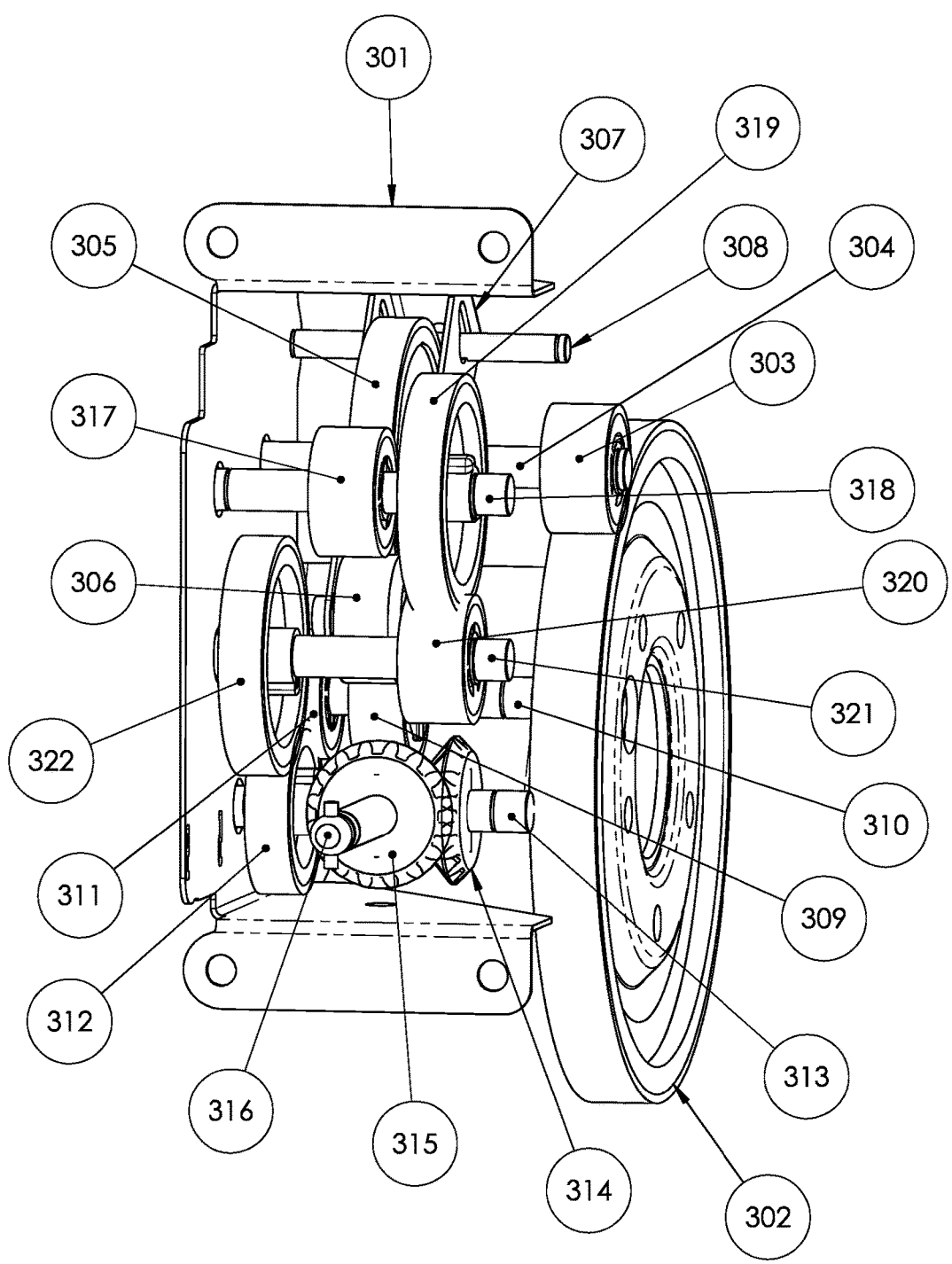
FIG. 3a depicts a rear perspective view of one potential embodiment of a disclosed transmission assembly.
Figure 3B:
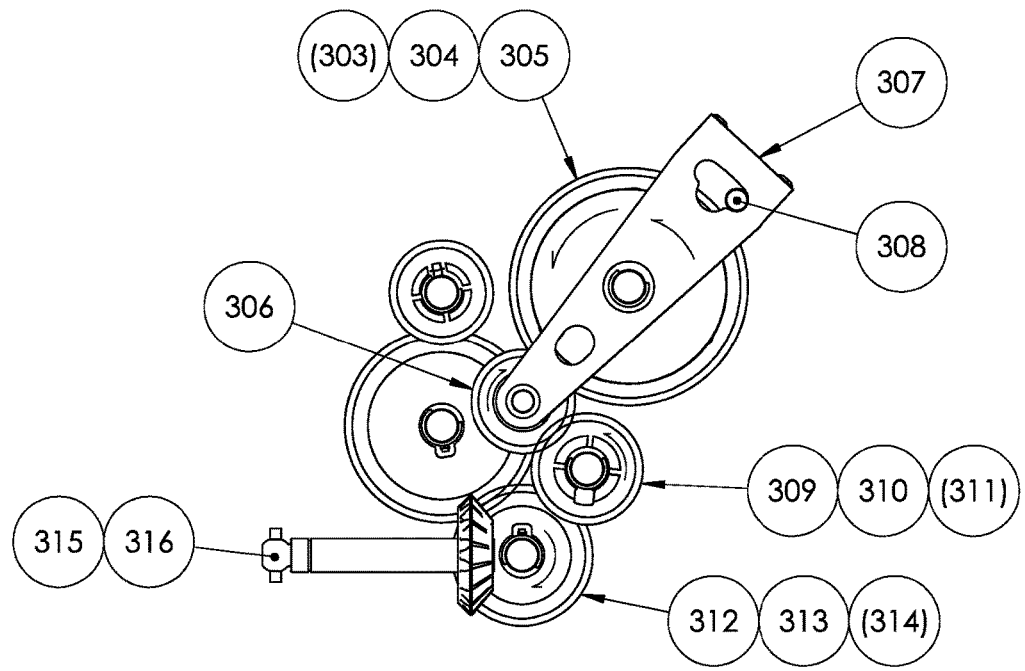
Figure 3C:
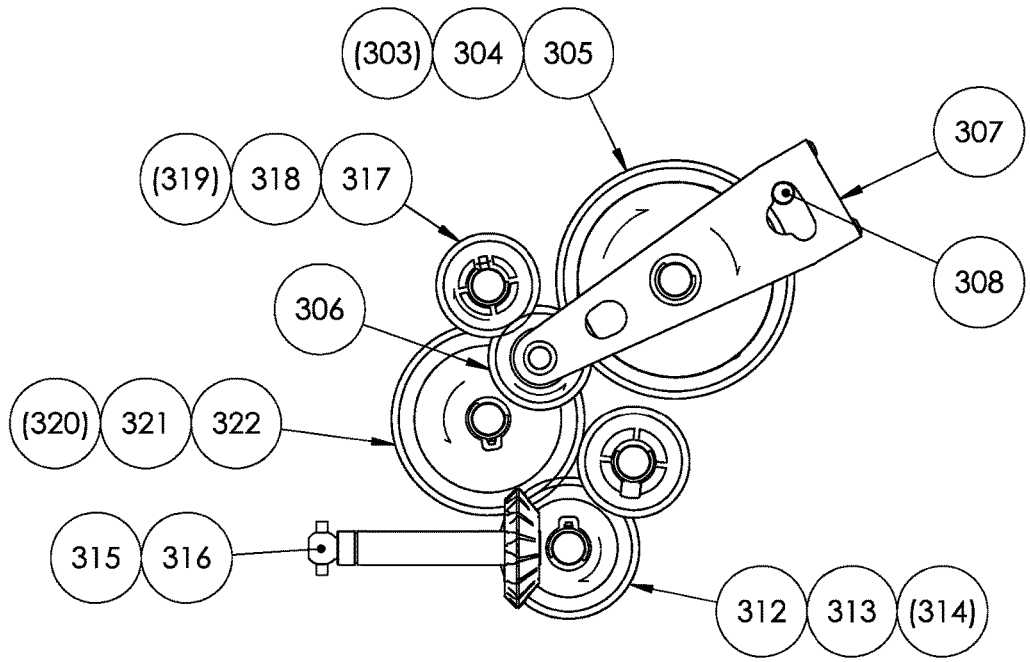
FIG. 3c shows the same interior side view of FIG. 3b, but an alternate transmission drive path.

FIG. 3 shows operation of a swing gear mechanism to select a torque reduction path within a modular power unit. FIGS. 3a-3c show interior views illustrating a swing gear function, with certain components omitted for clarity purposes. A housing (301) (right-hand and rear sides omitted from view) encloses a gear train. A ring gear (302) is mounted to, and rotates with, a pedal crankshaft and cranks (omitted from view) in a conventional manner. This ring gear drives a spur gear (303) affixed to a drive shaft (304) extending into, and supported by the housing. The drive shaft supports a coaxial sun gear (305), itself in permanent engagement with a planetary idler gear (306) mounted within a carrier (307) rotatable about a drive shaft axis. The carrier is designed to balance a rotating mass about the drive shaft axis so that operation is not adversely affected by gravity, and is constrained to an arc of rotation by an opening therein, through which passes a carrier stop shaft (308). The said carrier opening is designed to permit engagement of the planetary idler gear with one of two remote gears, each at opposite limits of carrier rotation in contact with the carrier stop shaft. At the counter-clockwise limit of carrier rotation (FIG. 3b), the planetary idler gear meshes with a first gear (309) mounted to a first transfer shaft (310) to which is further affixed a second gear (311). The second gear engages a third gear (312) mounted to a second transfer shaft (313), to which is further affixed a first bevel gear (314). The first bevel gear engages a second bevel gear (315) affixed to an output shaft (316) at right angles to the second transfer shaft, and terminating at a rearward end with a conventional universal-type joint interface. At an opposite, clockwise limit of the carrier rotation against said stop shaft (FIG. 3c), the planetary idler gear engages a fourth gear (317) affixed to a third transfer shaft (318), to which is further affixed a larger fifth gear (319), thus comprising a compound-gear, torque reduction stage of a power transmission. The fifth gear engages a sixth gear (320) affixed to a fourth transfer shaft (321), to which is further affixed a larger seventh gear (322), comprising an additional, compound-gear, torque reduction stage. The seventh gear engages the third gear on the second transfer shaft. Accordingly, a single path of power transmission from the sun gear to the bevel gears can be selected between a substantially direct path and an alternate path of substantial, further torque reduction, according to a direction of input rotation at a pedal crankshaft. Due to a particular arrangement of gearing employed in each power transmission path, output rotation from each path occurs in a common direction (i.e., clockwise), regardless of input rotation direction.

Figure 4A:
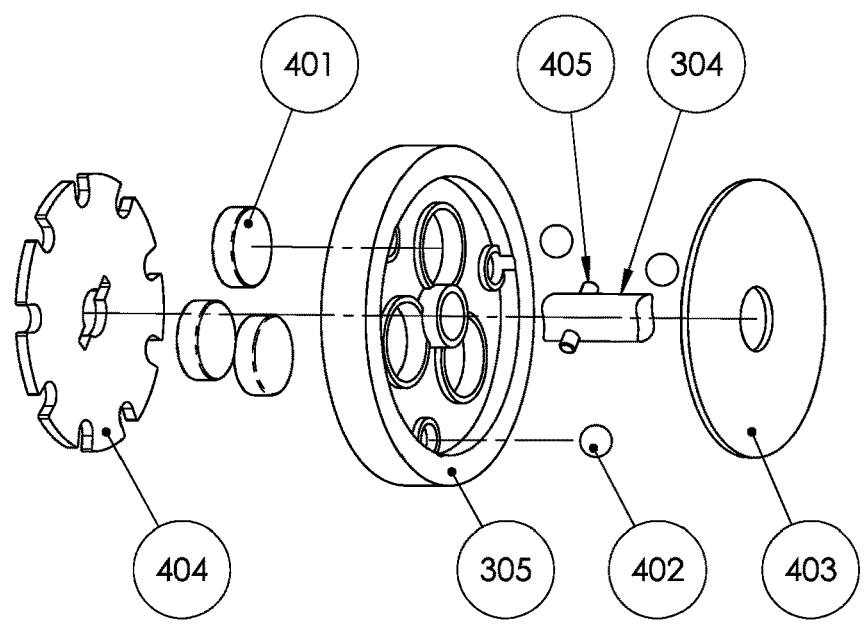
FIG. 4a shows a separated view of the components of an inventive torque limiting device.
Figure 4B:
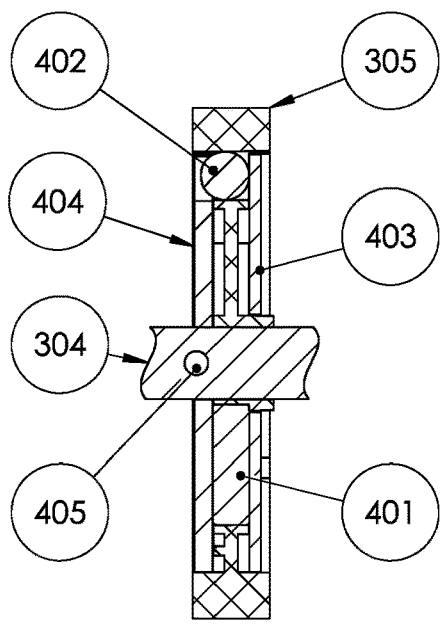
FIG. 4b shows a section view of the assembled torque limiting device in an engaged condition.
Figure 4C:
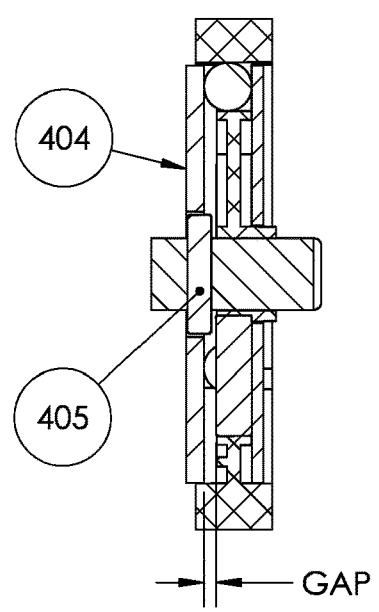
FIG. 4c shows a section view of the assembled torque limiting device in a disengaged condition.
Figure 4D:
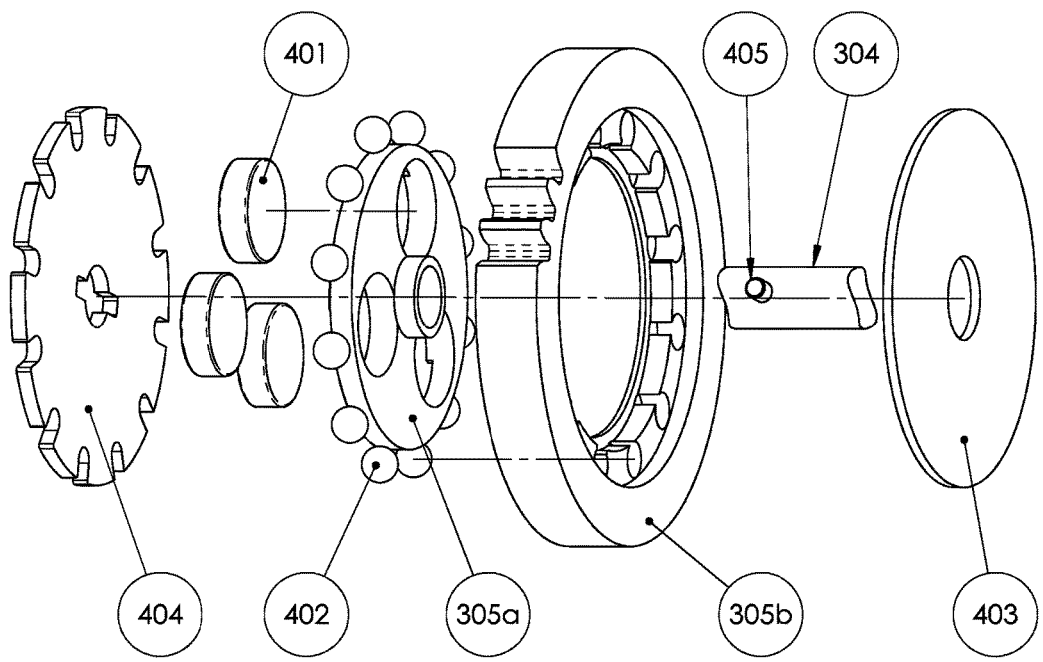
FIG. 4d shows a separated view of the components of an alternate embodiment of an inventive torque limiting device.
Figure 4E:
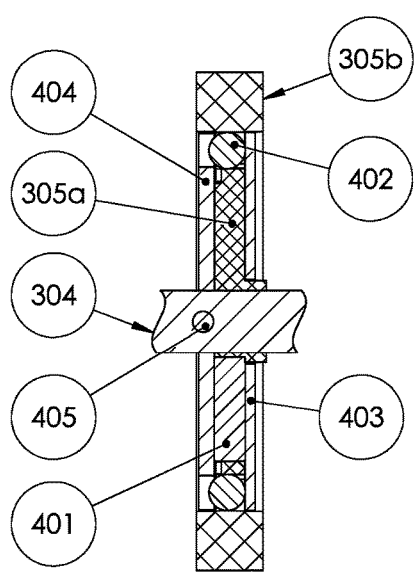
FIG. 4e shows a section view of the alternate embodiment of the torque limiting device in an engaged condition.
Figure 4F:
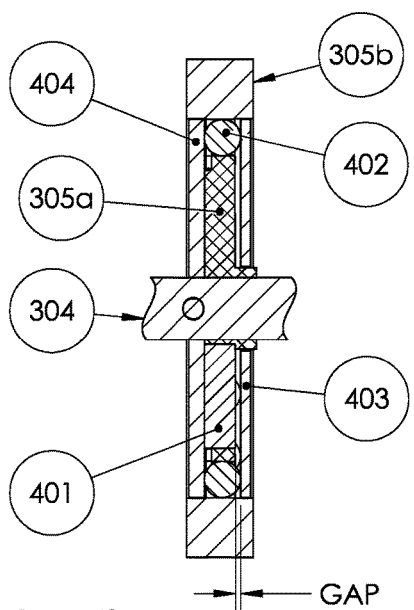
FIG. 4f shows a section view of the alternate embodiment of the torque limiting device in a disengaged condition.

FIGS. 4a-4f show a torque limiting device of two particular embodiments incorporated within a gear. A first embodiment is depicted in FIG. 4a-4c. An alternate embodiment is depicted in FIG. 4d-4f. The gear (305) of FIG. 4a, coaxially located on a shaft (304), includes three permanent magnets (401) and three bearing balls (402) mounted within openings of the gear. A magnetic body (403) is mounted about a protruding hub of the gear, contacting the magnets and the balls simultaneously. An indexing body (404), also magnetic, is mounted coaxial to said shaft, in contact with said magnets, and additionally comprises a slot feature engaging a cross pin (405) of the shaft, such that the pin will drive the indexing body in synchronous rotation with the shaft. FIG. 4b shows a torque limiting device in a normally engaged configuration with the balls protruding partially through openings of the indexing body. In this configuration, a torque is conventionally transferred from a shaft (304) and pin (405) to an indexing body (404). Reaction forces occur at contacting points of indexing body edges with balls (402), and consequently between contacting surfaces of balls against openings in gear (305). By this means, a driving torque may be transmitted from a shaft to a gear. At a position on a ball surface whereby contact occurs with an edge of an indexing body opening, a reaction force may be divided into two orthogonal components: a tangential force which acts to create a torque about a shaft axis, and an axial force acting normal to an indexing body, acting to separate an indexing body from a magnet exerting an attractive force in opposition thereto. A geometric relationship determined by ball diameter and contact position enables precise calculation of force vector components in a manner well known to those ordinarily skilled in the art. Therefore, a known separation force of a magnet and a magnetic body in a particular configuration may allow accurate prediction of a maximum torque transmitted through such a device before a magnet holding force is exceeded. FIG. 4c shows a condition wherein an indexing body (404) has separated to a gap from said magnets, and where said magnets continue to exert a net attractive force sufficient to maintain contact of the balls and the indexing body surface between openings, during an interval of relative rotation between the indexing body and the gear, caused by continuing application of (reduced) shaft torque. At a point where rotation of the indexing body nears the angular spacing of openings therein, edges of said openings will slide along contacting ball surfaces until an indexing body will again be pulled into contact with the magnets, completing a cycle of operation. FIG. 4d depicts an alternate embodiment of a torque limiting device of similar operation, but with a hub (305a) containing the magnets (401) separated from the annular ring gear (305b) containing the balls (402). In this alternate embodiment, the indexing body is preferably (but not necessarily) magnetic, in order to further concentrate the magnetic fields and increase attractive force of the magnets with the magnetic body. The outer diameter of the hub functions as the inner race of a ball bearing supporting the ring gear, and the ring gear functions as both the outer bearing race and the ball cage. FIG. 4e shows the engaged condition of the alternate embodiment in section view, with a function similar to that described previously in reference to FIG. 4b. FIG. 4f shows a disengaged condition of the alternate torque limiter embodiment, wherein interferences of the protruding balls (402) with contacting edges of slot openings in the indexing body (404) create a net axial force exceeding a magnetic attractive force of the magnets (401) with the magnetic body (403). In this case, the indexing body, magnets, and inner hub remain together with the ring gear in an unchanged axial position relative to the shaft (304), as the ring gear and balls rotate together about the shaft axis. The balls and magnetic body are together dislocated parallel to the shaft axis by the relative rotation of the indexing body, such that the balls are temporarily enforcing an increased separation of the indexing body and magnetic body, creating a separation gap between the magnets and magnetic body during an interval of reduced-torque rotation of the ring gear relative to the shaft. At a point where rotation of the indexing body nears the angular spacing of the openings therein, contacting ball surfaces will slide along edges of said openings until a magnetic body will again be pulled into contact with the magnets, completing a cycle of operation. One of ordinary skill in the art will note the configuration of FIG. 4d is advantaged over the configuration of 4a by the elimination of enforced relative rotation between the magnets and a magnetic body in the path of torque transmission, thereby eliminating the variable effect of significant sliding friction caused by the high magnetic attractive forces occurring at the interfaces therebetween. It will also be apparent to the ordinarily skilled artisan that the functions of an inner hub (305a), indexing body (404), and magnets (401) may be variously combined into fewer parts, though optimum performance of some functions may present mutually exclusive demands on available materials.

Figure 5B:
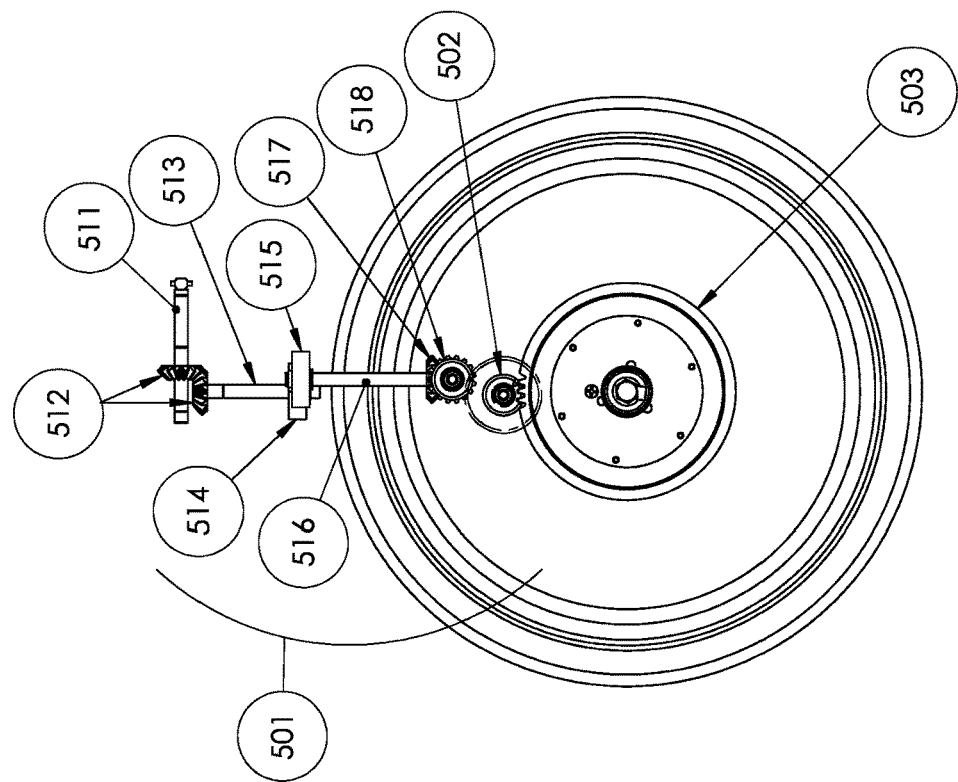
FIG. 5b shows a side view of the movable transmission with housing components removed.
Figure 5A:
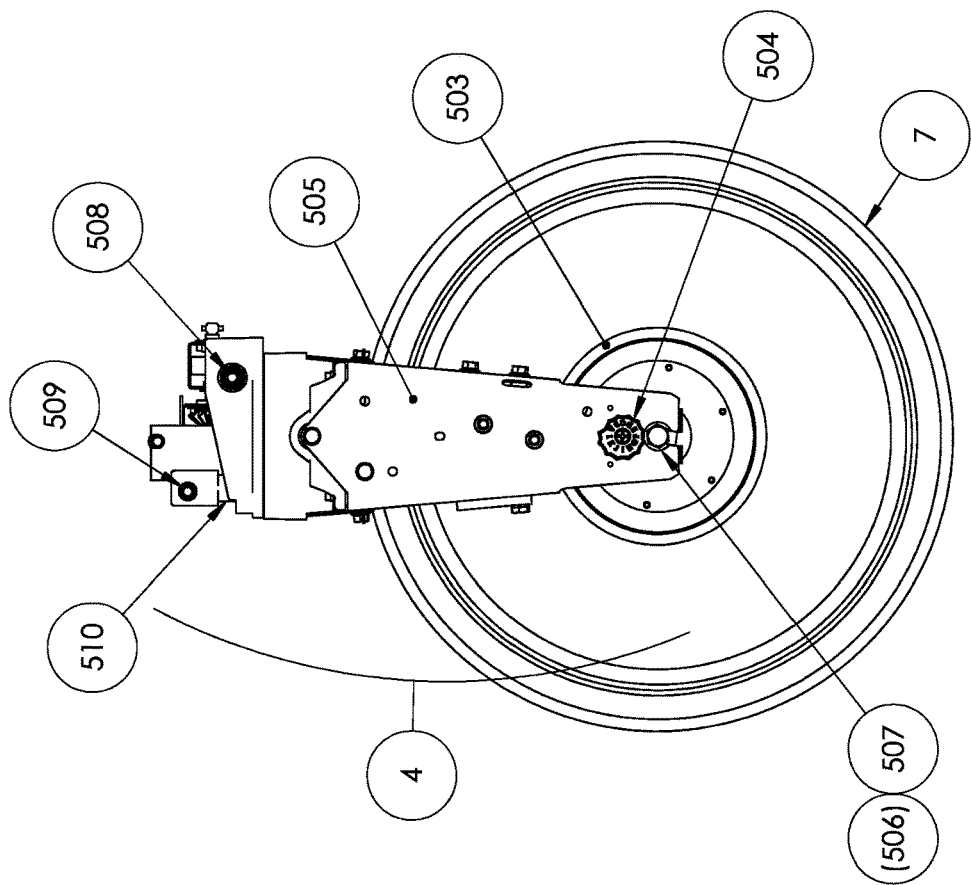
FIG. 5a depicts a side view of the movable transmission with a front wheel attached.
Figure 5C:
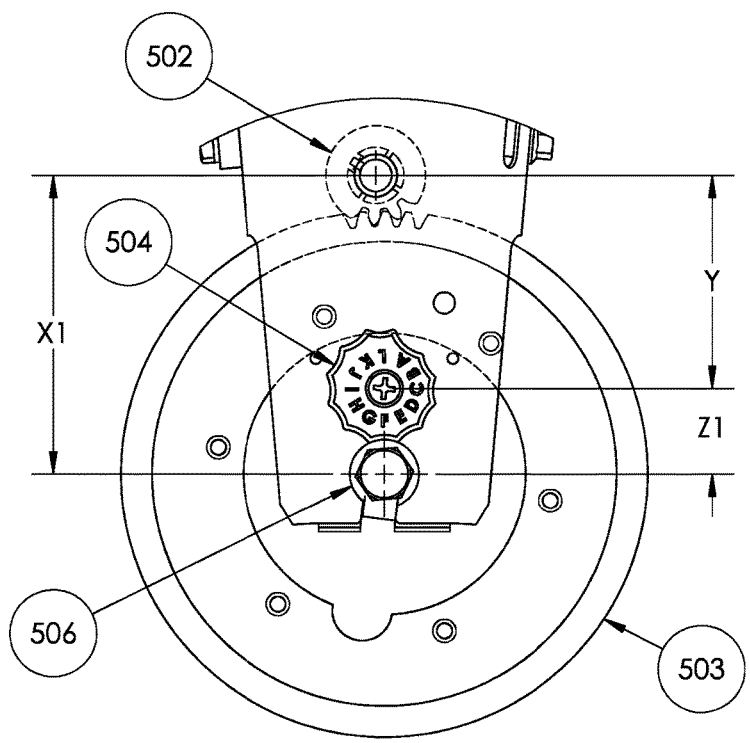
FIG. 5c shows an indexing cam assembled to the movable transmission housing.
Figure 5D:
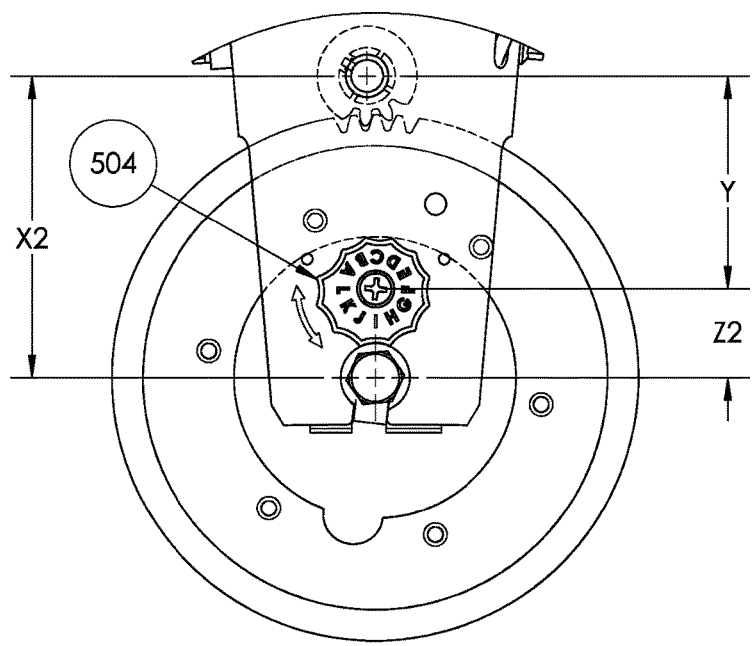
FIG. 5d shows an indexing cam assembled to the movable transmission housing in an alternate position of gear lash adjustment.

FIGS. 5a and 5b show a modular movable transmission assembly (4), housing a gear train (501) comprising an input shaft (511) driving through miter gears (512) a sun gear shaft (513), itself coaxial with a steering axis, to which is mounted a sun gear (514). An epicyclic spur gear (515) mounted to an offset shaft (516) drives a pinion gear (518) through miter gears (517), in turn driving a compound gear torque multiplication stage, comprising a pinion gear (502), meshing with a ring gear (503) of a wheel assembly (7). An indexing cam (504), mounted by a center screw to a movable transmission structure (505), progressively changes a separation distance between an axis of the indexing cam and a bearing surface of a wheel axle (506) when rotationally indexed among twelve positions marked from A to L. A change of said separation distance likewise changes a radial separation of the pinion and the ring gears, thereby effectively controlling gear lash. When an axle nut (507) is tightened to a said movable transmission structure in a conventional manner, an established spacing may be maintained permanently in service, including occasional removal and reinstallation of a wheel assembly from a movable transmission assembly. An identical indexing cam may be similarly used on an opposing side for the purpose of further setting and maintaining correct alignment of a wheel within the movable transmission assembly, and may be applied at other modular gear mesh interfaces, as well, such as that occurring between a pedal crank ring gear (302 of FIG. 3*a*) and a pinion gear of a modular power unit (303 of FIG. 3*a*). FIG. 5*c* shows closer detail of the indexing cam at position "F" as it sets a center distance between the ring gear (503), mounted coaxially with axle (506), and pinion gear (502) to the dimension X1. Dimension Y represents a fixed distance between the center of rotation of the indexing cam (504) and the pinion gear shaft axis. Dimension Z1 represents a variable distance between the cam center of rotation and the wheel axle as controlled by the indexing cam position. FIG. 5*d* shows the indexing cam rotated three steps CCW to position "I", incrementally increasing dimension Z1 to Z2, and thus increasing a gear center distance X1 to X2, effectively increasing the backlash between the pinion and ring gears by a prescribed amount, as will be understood by one of ordinary skill in the art. By this means, a tedious though functionally critical task of setting and maintaining correct backlash of this gear mesh may be accomplished upon removal and reinstallation of a wheel, without requiring extreme dimensional accuracy of the assembled parts or assembly process. Although this particular example of indexing cam function pertains to gear mesh at a driven wheel, the mechanism clearly applies generally to meshing gears of adjustable positioning within a transmission assembly.

Figure 6A:
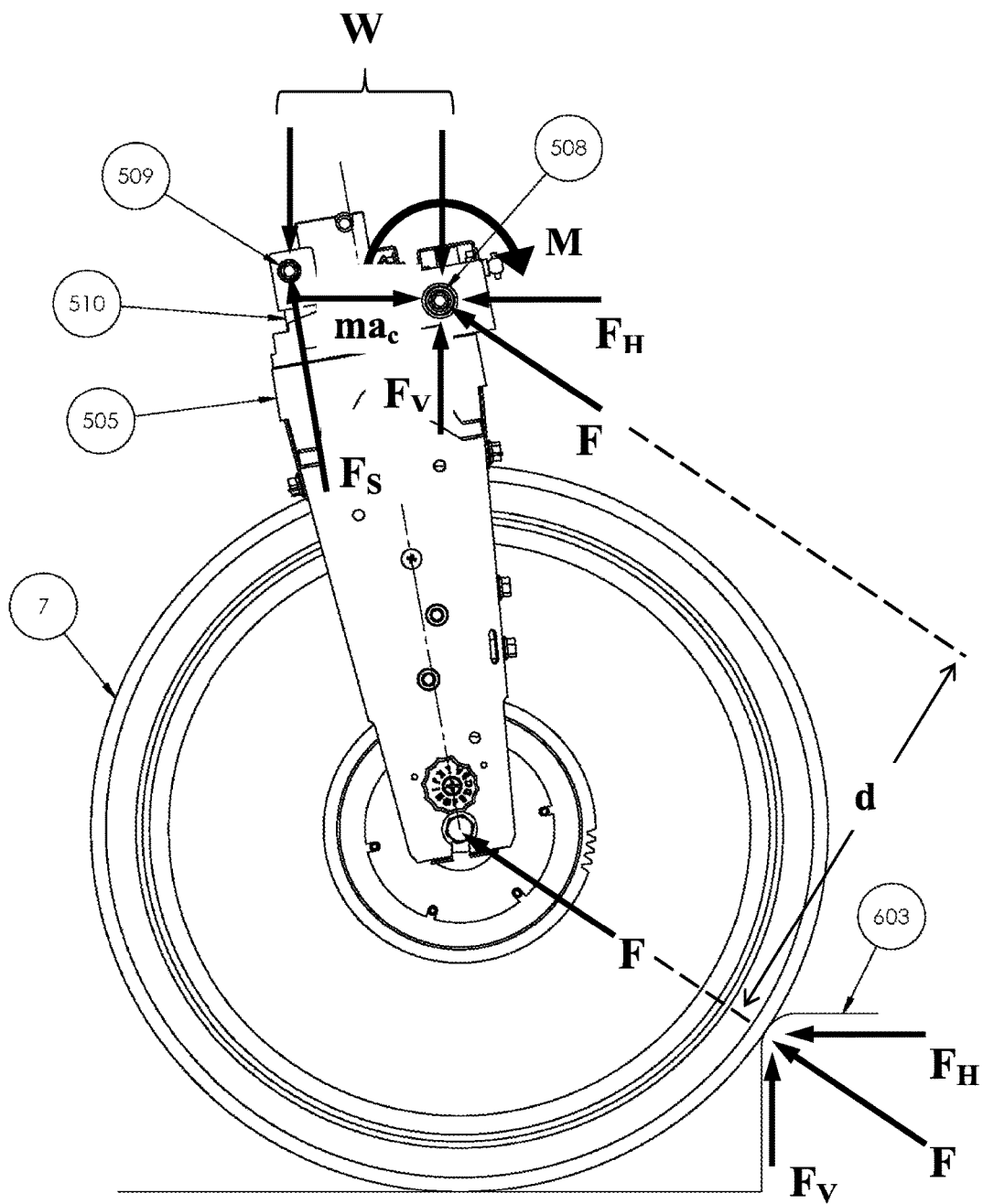
FIG. 6a shows a side view of the movable transmission and wheel with typical force vectors of collision loading.
Figure 6B:
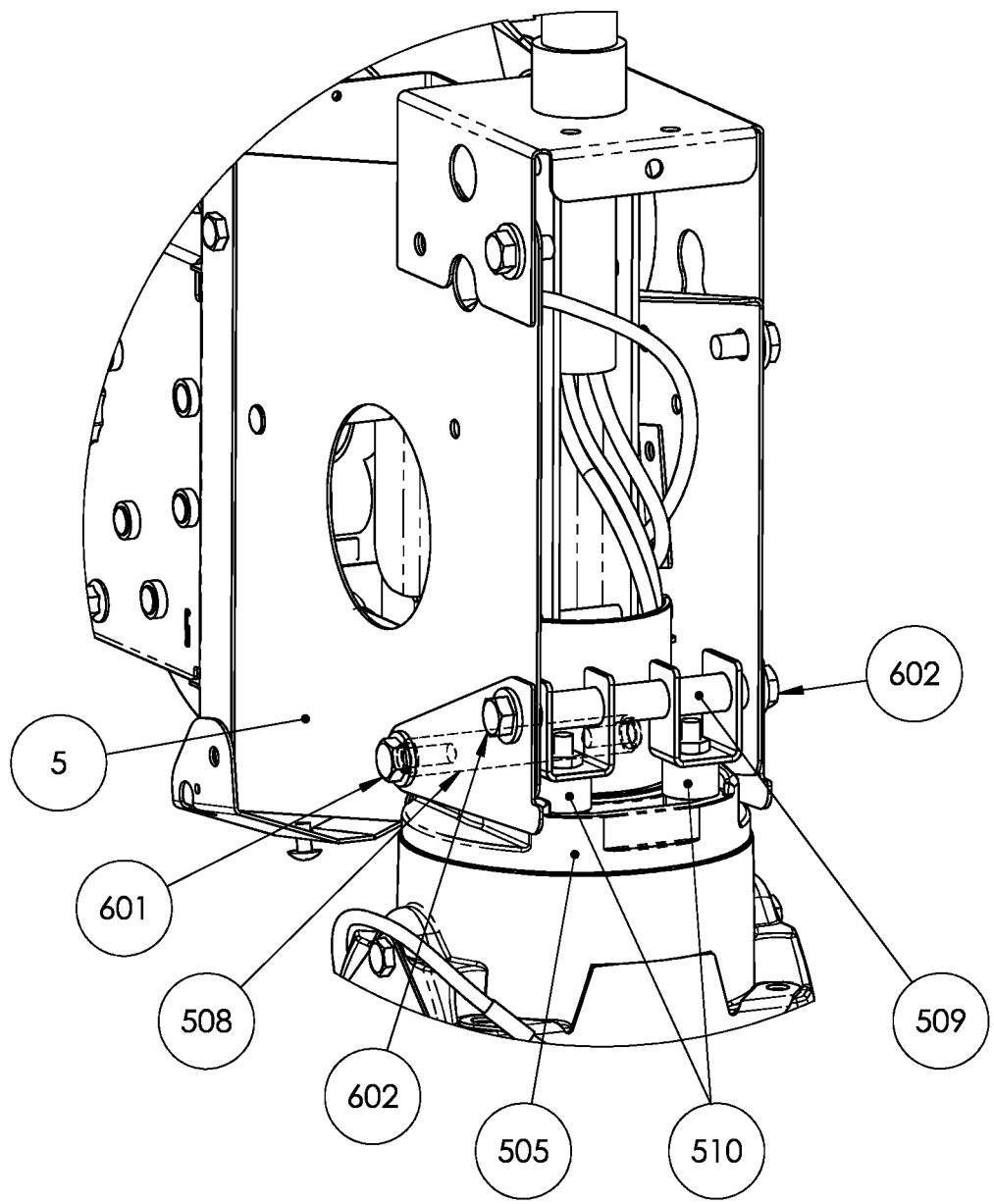
FIG. 6b shows a rear perspective view of the head frame assembly, revealing movable transmission suspension components.

FIG. 6*a* shows as simplified body force diagram of service loads borne by the movable transmission structure. Vectors ($F_H$) and ($F_V$) represent the respective horizontal and vertical components of a contact force (F) acting upon a front wheel (7) of a moving cycle colliding with a fixed object, such as a curbing (603). FIG. 6*b* shows a rear interior view of a head frame assembly with identification of movable transmission suspension components. Said contact force (F) transfers at a wheel hub to a supporting movable transmission structure (505), as shown. Functionally, an attachment of a movable transmission to a frame may support a moment (M) generated by a force vector (F) on a line of action at a distance (d) from a point of said attachment. A pivot shaft (508), itself rigidly affixed at each end to a head frame housing (5), and thus to a vehicle frame by a bolt (601), may be acted upon by said force (F) transferred through the movable transmission structure from the wheel. The horizontal component of said force ($F_H$) is opposed equally by a force ($m \cdot a_c$) created by the deceleration ($a_c$) of the cycle mass (m). Said pivot shaft supports rotation of said movable transmission structure on suitable bearings about an axis thereof, according to a moment (M) applied to the movable transmission structure. A second shaft (509) is likewise rigidly affixed at each end with a bolt (602) to the head frame housing and thusly to the vehicle frame. One or more shock absorbing elements (510) are positioned between the movable transmission structure, and said second shaft, so as to resist rotation of the movable transmission structure under the moment (M), by a net force ($F_S$) exerted by the movable transmission structure on the shock absorbing elements. Therefore, as a result of a moment created about a movable transmission structure pivot axis, a net body force ($F_V + F_S$) acting upon the vehicle frame acts to lift said vehicle frame against a portion of vehicle weight (W) supported thereupon. For simplicity, a desirable damping function is commonly derived by use of a stiffness element, such as rubber, which exhibits a damping effect due to energy dissipation within the material. In this case, rubber bumpers may act as both a spring and a damper in one shock absorbing element. Simply stated, during a time interval when a movable transmission structure is rotating backwards against a force of collision exerted by a rolling wheel striking an obstacle, a moment generated about a movable transmission pivot acts to accelerate a vehicle frame in an upward direction. This action, in turn, augments a vertical contact force component also acting to lift the weight of a vehicle frame. Such action may improve a tendency of a wheel to continue rolling upwards and over a low obstacle, further lessening a potential for damage in some cases.

The resultant inventive device thus accords great versatility and capability for an operator to maneuver under high drive torque conditions with great steering stability. Additionally, the potential for transport facilitation and overall accessibility for a variety of short travel purposes, all with not only the ability to utilize both a manual and electrical motion protocol, but also for exercise activity, all show the unexpectedly effective results such a novel device accords a suitable user.

The preceding examples are set forth to illustrate the principles of the invention, and specific embodiments of operation of the invention. The examples are not intended to limit the scope of the matter. Additional embodiments and advantages within the scope of the claimed invention will be apparent to one of ordinary skill in the art.

What is claimed is:

1. A wheel support component of a vehicle, comprising a movable transmission assembly, a driven wheel, a steering axis, and a shock-absorbing element, wherein said movable transmission assembly supports said driven wheel while said driven wheel is steered about said steering axis, wherein said movable transmission assembly further exhibits a substantially transverse pivot axis in relation to said steering axis, and wherein rotation of said movable transmission assembly and said driven wheel about said substantially transverse pivot axis generates a transfer of collision energy to said shock-absorbing element during operation of said driven wheel.

2. The wheel support component of claim 1 further comprising a plurality of meshing gears between said driven wheel and said movable transmission assembly, and an indexing cam affixed to said movable transmission assembly and arranged to effect a separation distance of said plurality of meshing gears, wherein said indexing cam permits setting and maintaining the spacing between said meshing gears on demand.

3. The wheel support component of claim 1 wherein said movable transmission assembly provides torque multiplication.

4. A manual vehicle comprising said wheel support component of claim 1.

* * * * *